United States Patent
Matischuk et al.

(10) Patent No.: US 6,845,750 B2
(45) Date of Patent: Jan. 25, 2005

(54) METHOD AND DEVICE FOR CONTROLLING THE DRIVE UNIT OF A VEHICLE

(75) Inventors: Lilian Matischuk, Stuttgart (DE); Holger Jessen, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 10/168,039

(22) PCT Filed: Dec. 15, 2000

(86) PCT No.: PCT/DE00/04474
§ 371 (c)(1),
(2), (4) Date: Feb. 19, 2003

(87) PCT Pub. No.: WO01/44639
PCT Pub. Date: Jun. 21, 2001

(65) Prior Publication Data
US 2004/0045524 A1 Mar. 11, 2004

(30) Foreign Application Priority Data

Dec. 18, 1999 (DE) .......................................... 199 61 291
Apr. 4, 2000 (DE) .......................................... 100 16 647
Nov. 24, 2000 (DE) .......................................... 100 58 355

(51) Int. Cl.$^7$ .............................................. F02D 41/00
(52) U.S. Cl. ............................ 123/339.19; 123/406.23; 123/478; 123/673; 180/197; 477/107; 701/110
(58) Field of Search .................... 123/339.19, 352–357, 123/406.23, 406.2, 673, 478, 480; 180/179, 197; 477/107, 108; 701/110

(56) References Cited

U.S. PATENT DOCUMENTS

| | | | |
|---|---|---|---|
| 4,708,111 A | | 11/1987 | Akahori et al. |
| 4,730,590 A | | 3/1988 | Sogawa |
| 5,754,424 A | * | 5/1998 | Melvin .......................... 700/37 |
| 6,164,901 A | * | 12/2000 | Blotenberg ...................... 415/1 |
| 6,445,961 B1 | * | 9/2002 | Melvin .......................... 700/32 |

FOREIGN PATENT DOCUMENTS

| | | |
|---|---|---|
| DE | 197 39 567 | 3/1999 |
| EP | 0 937 886 | 8/1999 |

* cited by examiner

Primary Examiner—John T. Kwon
(74) Attorney, Agent, or Firm—Kenyon & Kenyon

(57) ABSTRACT

A method and a device for controlling the drive unit of a vehicle. In this context, at least one correction variable of the drive unit is set as a function of a setpoint value for an output variable of the drive unit, and as a function of a setpoint correction time, which represents the time in which the setpoint value for the output variable must be attained.

11 Claims, 7 Drawing Sheets

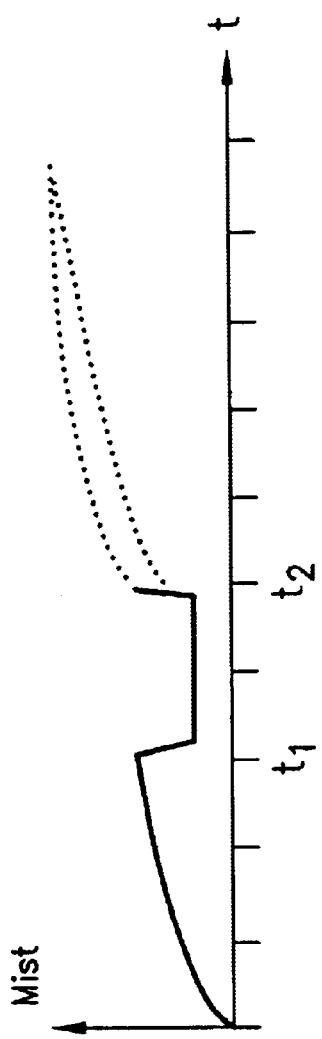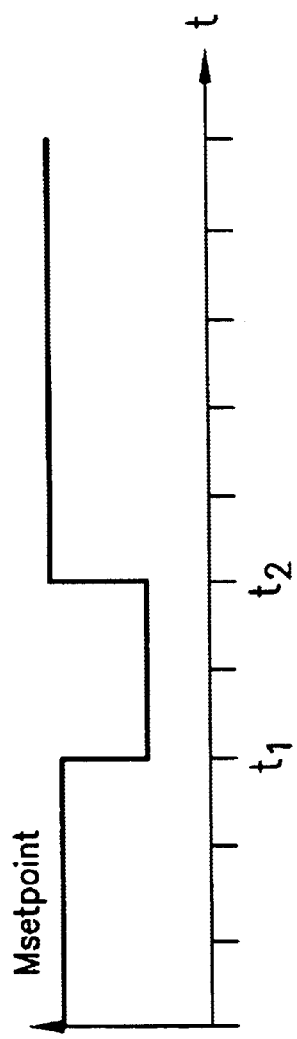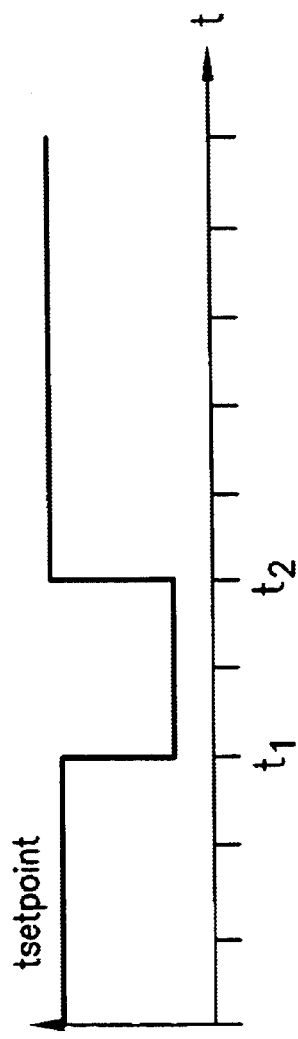

METHOD AND DEVICE FOR CONTROLLING THE DRIVE UNIT OF A VEHICLE

FIELD OF THE INVENTION

The present invention relates to a method and a device for controlling the drive unit of a vehicle.

BACKGROUND INFORMATION

In modern vehicle control systems, several partially opposing demands act on the existing actuators (e.g. drive unit, transmission, etc.). Thus, the drive unit of a vehicle should be controlled, for example, on the basis of a command input by the driver and setpoint values from external and/or internal closed-loop and open-loop control functions, such as a traction control system, an engine drag-torque control system, a transmission control system, an engine-speed and/or speed-limitation control system, and/or an idling-speed control system. These setpoint selections act partially in opposition to each other so that, since the drive unit may only adjust one setpoint selection, these setpoint selections are coordinated, i.e. a setpoint selection to be realized is chosen or determined.

In the context of controlling a drive unit, German Published Patent Application No. 197 39 567 describes such a coordination of different setpoint torque values. In this case, using maximum-value and/or minimum-value selection, setpoint values for the drive-unit control paths, which are realized in the current operating state by determining the magnitudes of the individual control parameters of the drive unit, e.g., in the case of an internal combustion engine, the charge, the ignition angle, and/or the amount of fuel to be injected, are selected from the setpoint torque values. In this case, boundary conditions for adjusting the setpoint values are not considered.

SUMMARY

The definition of a demand on the drive unit as a setpoint-output-value/correction-time value pair is accomplished during the coordination of different demands, an independence of from engine-specific control paths results Therefore, the definition of an interface as a setpoint-output-value/correction-time value pair is therefore suitable for all types of drive units, regardless of the specific type of drive unit. Therefore, coordinators not specific to the engine may be used in different types of drive units without modification, such as spark-ignition engines, diesel engines, electrical drive units, etc.

It may be advantageous that an expansion of the system, i.e. adding further setpoint-output-value/correction-time value pairs, may be accomplished in a simple manner, without structural changes.

The specific execution of the demand (setpoint output value and correction time) then occurs as a function of the instantaneous operating point, on the suitable control paths of the drive unit. By demanding a correcting time for each setpoint variable independently of the operating point, this engine-specific part of the control system may be developed separately from the part that is independent of the engine.

The definition of the above-mentioned, abstract, and physically interpretable interface renders the overall structure of the engine control unit clearer.

The separation of engine-independent and engine-specific components as a result of introducing the setpoint-value/correction-time interface attains an additional degree of freedom, which relates to performing demand in the engine-specific part of the engine control unit. The options for carrying out the demand are increased by different control paths, and additional optimization potential is freed.

A further, additional degree of freedom results from specifying a continuously variable correction time for the setpoint value, which may allow the actions in the drive unit to be selected and performed in a precise manner.

The different demands are combined by coordinating setpoint value demands and correction time demands in an advantageous manner, so that a demand pair is made available (in each case, with respect to correction time and setpoint value) for the control of the drive unit.

The present invention is explained in detail below, with the aid of the specific example embodiments represented in the drawings.

BRIEF DESCRIPTION OF THE DRAWINGS

FIG. 6 is a timing diagram which plots torque M verus time, where current time To.

FIG. 10 illustrates a timing diagram and an example of the mode of operation of the setpoint-value/correction-time selection and coordination.

FIG. 10a illustrates the time characteristic of the actual torque of the drive unit.

FIG. 10b illustrates the time characteristics of the setpoint torque.

FIG. 10c illustrates the time characteristic of the setpoint correction time.

DETAILED DESCRIPTION

Figure 1:
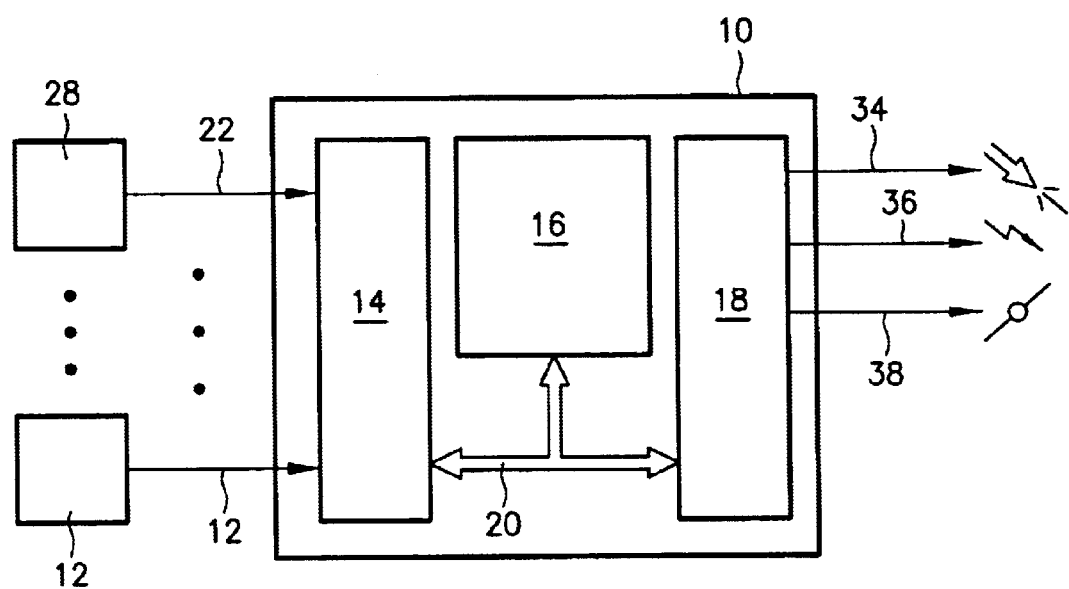
FIG. 1 illustrates a general circuit diagram of a control device for controlling a drive unit.

FIG. 1 illustrates a block diagram of a control device for controlling a drive unit, e.g., an internal combustion engine.

A control unit 10 is provided, which includes an input circuit 14, at least one computational unit 16, and an output circuit 18 as components. A communications system 20 connects these components for mutual exchange of data. Leading to input circuit 14 of control unit 10 are input lines 22 through 26, which, in an example embodiment, are in the form of a bus system, and via which control unit 10 receives signals that represent performance quantities to be evaluated for the control of the drive unit. These signals are detected by measuring devices 28 through 32. Such performance quantities include accelerator position, engine speed, engine load, exhaust-gas composition, engine temperature, etc. Control unit 10 controls the performance of the drive unit, using output circuit 18. In FIG. 1, this is symbolized by output lines 34, 36, and 38, via which the mass of fuel to be injected, the ignition angle, and/or an electrically operable throttle valve for adjusting the supply of air to the internal combustion engine, are controlled. The supply of air to the internal combustion engine, the ignition angle of the individual cylinders, the mass of fuel to be injected, the injection time, and/or the air-fuel ratio, etc., are adjusted via the represented control paths. In addition to the described input variables, other control systems of the vehicle, which transmit setpoint values, e.g. a setpoint torque value, to input circuit 14, are present. Examples of such control systems include traction control systems, electronic stability programs, transmission control systems, engine drag-torque control systems, etc. In addition to the represented setpoint selections and the external setpoint selections, to which a setpoint selection by the driver in the form of a driver command and/or a speed limitation also belong, internal setpoint values for controlling the drive unit, e.g. a torque change of an idle-speed control system, an engine-speed control system that outputs a corresponding setpoint value, a torque-limiting system, and/or limitations for protecting components, and/or a separate setpoint value during start-up, are also present for controlling the drive unit.

Associated with the individual, selected setpoint values are boundary conditions or characteristics, which represent the manner of attaining the selected setpoint values. Depending on the application example, one or more characteristics may be associated with the selected setpoint values. The correction time, within which the selected setpoint value is to be set, has proven to be an important information item. In addition, other characteristics of the setpoint value selection may be communicated, for example its priority. In this context, correction time is to be understood as the time frame in which the setpoint value must at least be set. Between the current (starting) value and the setpoint value (end value), the curve of the actual value influenced by the setpoint value during the correction time is freely determinable, depending on the selected target. This curve may therefore be adjusted to the engine and optimized in accordance with at least one optimization criterion (e.g. minimum fuel consumption). The actual value only has to be reached at the instant of the correction time, i.e. at the end of the correction time.

The described selection of the setpoint value and the correction time as a pair of values is not only to be used in connection with internal combustion engines such as spark-ignition engines or diesel engines, be it with multipoint injection or direct injection, but also in connection with other drive configurations such as electric motors.

In an example embodiment, a torque of the drive unit is specified as a setpoint selection variable. In other application cases, different output variables of the drive unit, such as power values, speeds, etc., may be provided as setpoint-selection variables.

Figure 2:
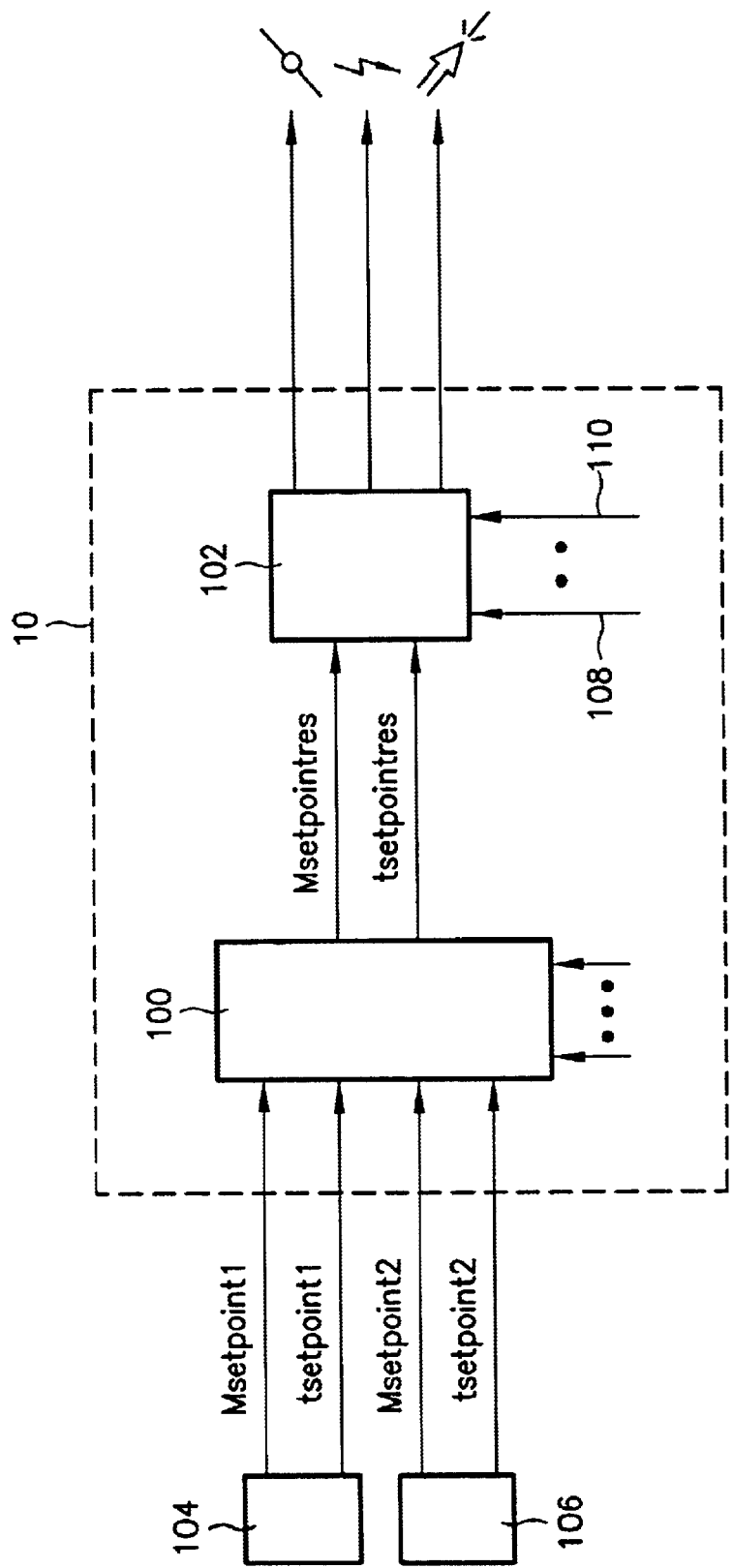
FIG. 2 illustrates a flowchart, which represents an example embodiment of the setpoint-value/correction-time interface. The mode of operation of this interface is illustrated by the timing diagram of FIG. 5.

FIG. 2 illustrates a flowchart, which represents the above-described interface and the conversion of the setpoint-value selection pair into correcting variables, using a simple example embodiment. In this connection, control unit 10 essentially includes a coordinator 100, as well as a converter 102. In addition to input variables not shown, e.g. those mentioned above, setpoint torques MSETPOINT1 and MSETPOINT2 and the corresponding correction times TSETPOINT1 and TSETPOINT2, within which the specified setpoint torque is to be set, are supplied as input selection variables from external control systems, such as a traction control system 104 and the driver 106, respectively. These setpoint-value pairs are supplied to coordinator 100. A resulting setpoint-value pair MSETPOINTRES and TSETPOINTRES is selected here, e.g. according to one of the following strategies, and possibly under consideration of additional setpoint-value pairs. This is supplied to converter 102. In converter 102, the correcting variables for controlling the air supply, the ignition, and/or the fuel injection are calculated, taking into consideration the current operating state of the drive unit, which is done on the basis of performance quantities such as engine speed, engine load, actual torque, etc. (cf. symbolic lines 108 through 110). In order to select the specific control path, an example embodiment provides tables in which the minimum correction times of the individual control paths are each recorded for a certain torque change, as a function of the current operating state of the drive unit. The control path, via which the torque change may be implemented within the setpoint correction time, is selected as a function of the predefined setpoint correction time and the intended torque change, in accordance with a predetermined strategy (e.g. optimized fuel consumption). If it is not possible to implement the torque change via one path alone, then a combination of control paths is selected, which ensures that the setpoint torque is reached within the predetermined correction time.

In another example embodiment, a further coordinator is provided between coordinator 100 and converter 102. In the further coordinator, the resulting variables of coordinator 100, which only relates to variables independent of the engine, are properly coordinated with engine-specific setpoint-value/correction-time value pairs (torque limitations, speed limitations, etc.). The output signal is a resulting setpoint-torque/correction-time value pair, which is supplied to converter 102 and converted into the individual correcting variables as described above.

In FIG. 5, timing diagrams are plotted, which represent the curve of the drive-unit torque at various times, in response to changing the setpoint torque value and the setpoint correction time. In this context, FIG. 5a illustrates the time characteristic of the setpoint torque, and FIG. 5e illustrates the time characteristic of the correction time, while the curve of actual torque M is plotted in FIG. 5b through 5d. FIG. 5a illustrates the curve of the setpoint torque and, the setpoint torque increasing from time T0 to time T0+T, and then remaining constant until time T0+2T. The correction time remains constant between times T0 and T0+T, while it is decreased up to time T0+2T. Accordingly, the than expected torque characteristic is represented at time T0 in FIG. 5b, and at time T0+T in FIG. 5c. The setpoint correction time is constant and the setpoint torque value is increased, so that the expected torque characteristic is adapted in an appropriate manner. At time T0+2T, the setpoint torque value remains constant but the correction time is considerably reduced, so that a considerably quicker torque change will result. In this case, it is important that the correction time continuously varies and is adjusted at each time point (e.g. the correction time becomes smaller and smaller when the conditions do not change and the torque stays the same, in order to ensure that the torque is set after the original correction time.

Various strategies have proven to be suitable for coordinating the value pairs in coordinator 100 and coordinators provided in the engine control unit, namely minimum coordination, maximum coordination, additive coordination, subtractive coordination, maximum coordination oriented to the correction time, and/or minimum coordination oriented to the correction time.

Figure 3:
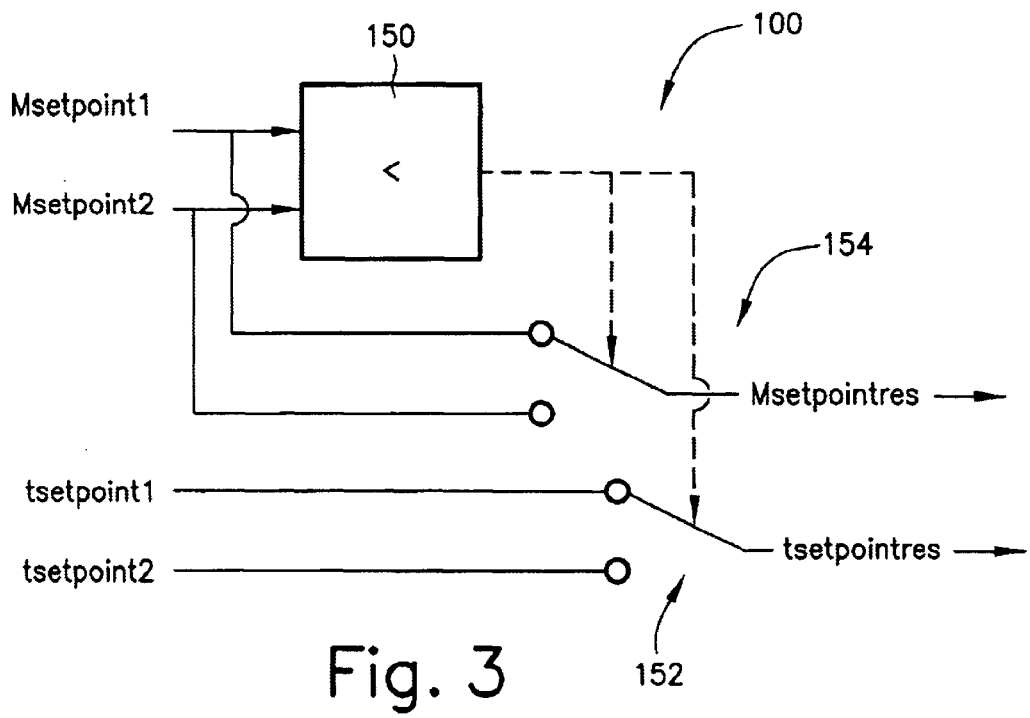
FIG. 3 illustrates a flow chart, which represents an example embodiment of the coordination of setpoint-value/correction-time demands.

An example of the minimum coordination is represented in the flowchart of FIG. 3. This consists in comparing the values of the setpoint torques and selecting the smallest as the resulting setpoint torque. The resulting correction time is then the correction time assigned to this torque. In this coordination strategy, the number of value pairs to be coordinated is unlimited. In addition to the correction time, further information items, such as the priorities assigned to the individual actions, or other information items, may analogously be selected in a corresponding manner.

FIG. 3 illustrates a flowchart of the minimum coordination in coordinator 100. Supplied are setpoint torques MSETPOINT1 and MSETPOINT2, which are routed to a comparator 150. This comparator determines the smallest of the two setpoint values. Depending on the result, the output signal of comparator 150 actuates switching elements 152 or 154, which in turn output the lowest setpoint torque value as the resulting setpoint torque. In addition, coordinator 100 is supplied correction times TSETPOINT1 and TSETPOINT2, comparator 150 switching the switching elements 152 in such a manner that, in each case, the correction time assigned to the smallest torque is output as resulting correction time TRES.

Figure 4:
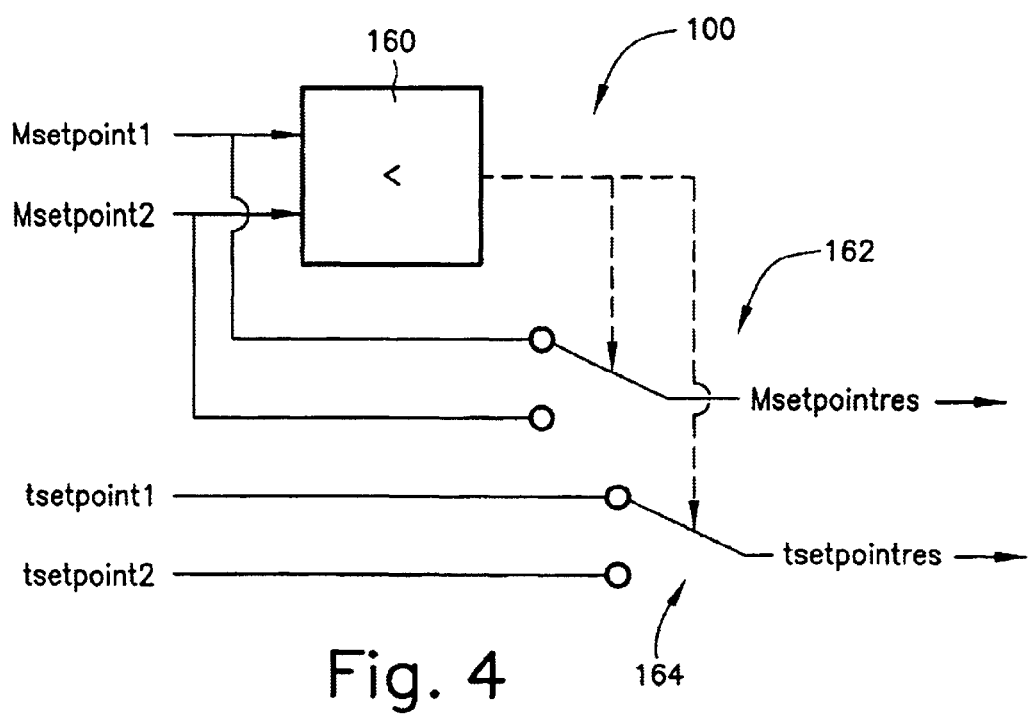
FIG. 4 illustrates a flow chart, which represents an example embodiment of the coordination of setpoint-value/correction-time demands.
Figure 5A:
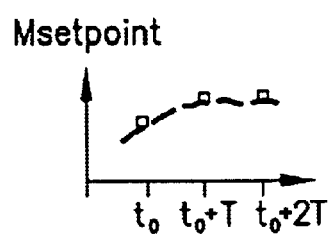
FIG. 5a is a timing diagram which represents the curve of the drive-unit torque at a point in time.
Figure 5E:
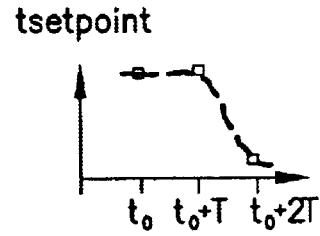
FIG. 5e is a timing diagram which represents the curve of the drive-unit torque at a point in time.
Figure 5B:
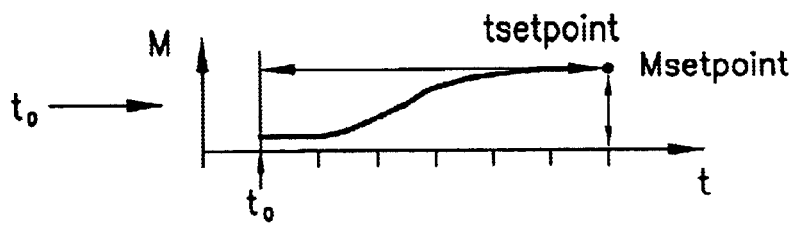
FIG. 5b is a timing diagram which represents the curve of the drive-unit torque at a point in time.
Figure 5C:
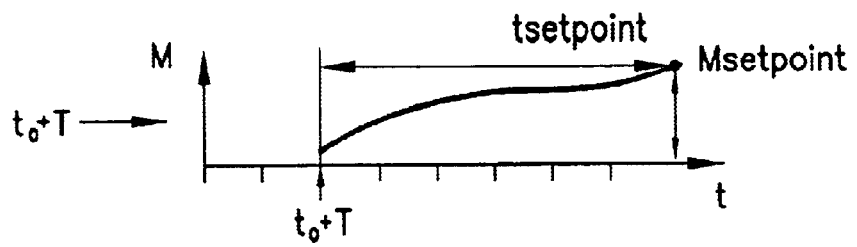
FIG. 5c is a timing diagram which represents the curve of the drive-unit torque at a point in time.
Figure 5D:
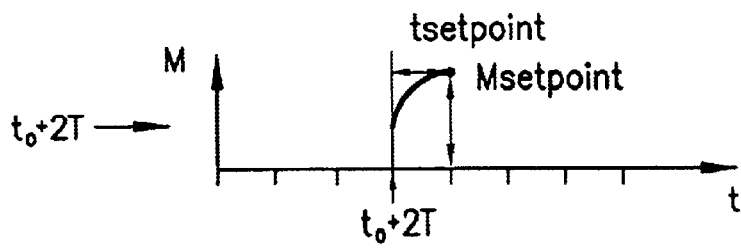
FIG. 5d is a timing diagram which represents the curve of the drive-unit torque at a point in time.

FIG. 4 illustrates a flowchart for the maximum coordination. In the maximum coordination, the values of the setpoint torques are likewise compared, but the largest, not the smallest, of the setpoint torques is selected. In this case, the resulting correction time is also the correction time assigned to the greatest torque. Analogously to the minimum coordination, coordinator 100 includes, for the maximum coordination, a comparator 160, which is supplied setpoint torques MSETPOINT1 and MSETPOINT2, and whose output signal controls switching elements 162 and 164. Comparator 160 determines the largest of the supplied torques and switches switching elements 162 and 164 accordingly. This is accomplished in that switching element 162 selects the largest torque value as resulting setpoint torque value MSETPOINTRES and the correction time assigned to the largest torque value as resulting correction time TSETPOINTRES.

The minimum coordination is especially used in torque-reducing actions and, e.g., in gear-switching actions and traction-control actions, while the maximum selection is used in torque-increasing actions, such as the action of an engine drag-torque control system.

It has been shown, that the minimum and the maximum coordination are not sufficient for covering all conceivable application cases. For example, the drive unit must generate an additional torque in a relatively short correction time, when ancillary components such as an air conditioner are switched on. If this coincides with an increase in the setpoint torque, the maximum-value or minimum-value coordination may produce an uncomfortable torque characteristic. Therefore, the intention is to not coordinate the correction times and the setpoint torques independently of each other, but rather to link them to each other. A coordination strategy, in which the setpoint-torque values are added, is represented in the timing diagram of FIG. 6. In the case of this so-called additive coordination of the setpoint-torque/correction-time value pairs, the smallest correction time is determined first. Using interpolation, an interpolated setpoint torque is then determined for this correction time, for the at least one additional setpoint-torque/correction-time value pair. The resulting setpoint torque is the sum of the possibly interpolated setpoint torques at the lowest correction time. The resulting correction time is the lowest correction time. Depending on the application case, a linear, exponential, monotonic, or non-monotonic function is provided as the interpolation function. In this context, the interpolation is performed on the basis of the actual torque or another torque, for example, the last setpoint torque. Apart from the correction time, other information items, such as priorities, may also be selected in this case.

Figure 6:
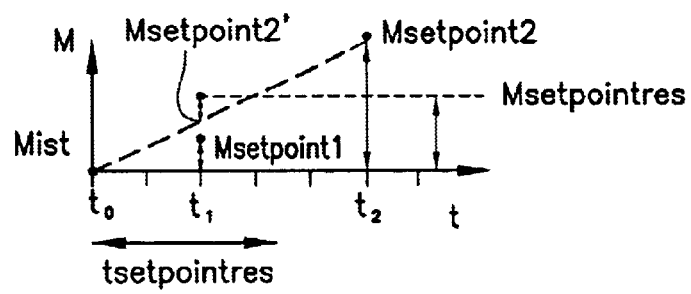

In FIG. 6, torque M is plotted versus time, where current time T0 represents the coordinate origin and MACTUAL represents the currently existing torque. The resulting correction time for setting the setpoint torques is the smallest of the supplied correction times TSETPOINTRES, i.e. T1. In the example illustrated, it is intended that two setpoint torques be coordinated, namely MSETPOINT2, which is assigned correction time T2, and MSETPOINT1, which is assigned correction time T1. In order to give consideration to the attainment of both setpoint torque MSETPOINT1 and setpoint torque MSETPOINT2 during the selection of the shortest correction time, t he torque magnitude MSETPOINT2' reached at time T1 during the realization of setpoint-torque value MSETPOINT2 is calculated on the basis of the (dotted) interpolation lines provided in this example. This torque magnitude is then added to the setpoint-torque value MSETPOINT1 to be reached at time T1, resulting setpoint-torque value MSETPOINTRES is calculated by adding the two values. Setpoint-torque value MSETPOINTRES is then reached within time T1, in which case not only the setpoint-torque value MSETPOINT1 assigned to the smallest correction time, but also the value MSETPOINT2 assigned to the other correction time, are considered.

Accordingly, a subtractive coordination is provided, which is used, e.g. when load circuits are switched off, and in which the smallest correction time of the supplied value pairs is likewise determined. In this case, the setpoint torque, which is assumed at this time and calculated by interpolation, is also determined for the at least one additional value pair, using interpolation. The resulting setpoint torque is then the difference of the interpolated setpoint torques of the smallest correction time, depending on the specified relationship. The resulting correction time is the smallest correction time. The interpolation and consideration of any other additional information items is performed analogously to the additive coordination.

Figure 7:
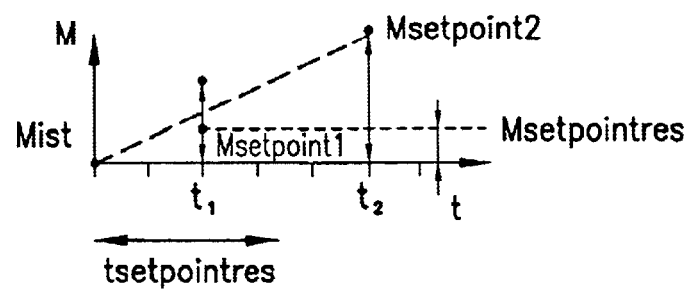
FIG. 7 is a timing diagram which illustrates the curve of the torque verus time, in a manner analogous to FIG. 6.

FIG. 7 illustrates the curve of the torque versus time, in a manner analogous to FIG. 6. In this case, the resulting correction time is also T1. The setpoint torque to be reached in this correction time is MSETPOINT1. The setpoint torque for value pair MSETPOINT2/T2, which is interpolated for time T1, is then subtracted from MSETPOINT1 to yield resulting setpoint torque MSETPOINTRES, which is ultimately set within setpoint correction time T1.

A further possibility for linking the value pairs is the maximum or minimum selection oriented to the correction time. This represents an alternative to the coordination according to FIGS. 3 and 4, the difference being that the smallest correction time of the communicated setpoint-torque/correction-time value pairs is generally selected, while, in the solution of FIGS. 3 and 4, the correction time assigned to the selected torque is always selected. This may allow the dynamic conditions to be taken into consideration more effectively. For this correction time, setpoint torques interpolated for the remaining value pairs are determined as explained above, using interpolation. The resulting setpoint torque is then the smallest (minimum) or the largest (maximum) of the setpoint torques at the instant of the smallest correction time. The resulting correction time is the lowest correction time. In this case, the interpolation and consideration of additional information items is also accomplished as mentioned above.

Figure 8:
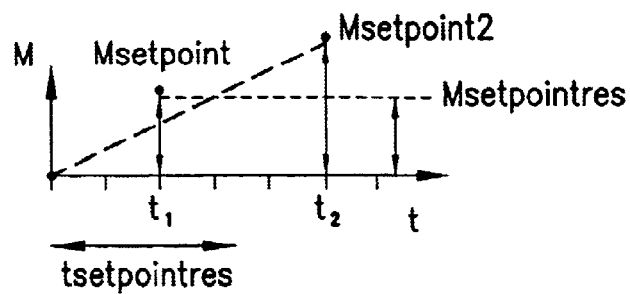
FIG. 8 is a timing diagram which plots torque verus time.
Figure 9:
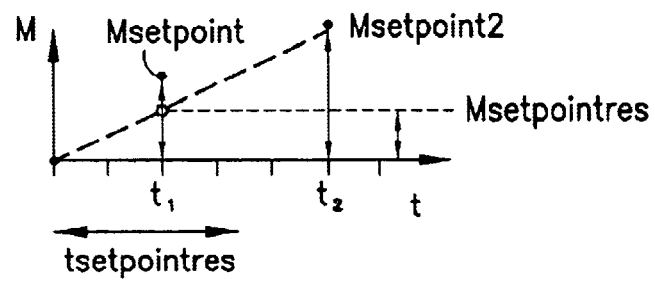
FIG. 9 is a timing diagram which plots torque verus time.

This coordination strategy is outlined by the timing diagrams of FIGS. 8 and 9. In each, the torque is plotted versus time. In each instance, correction time T1 is the smallest of the supplied correction times. According to FIG. 8, the setpoint torque belonging to correction time T1 is MSETPOINT1, and the setpoint torque belonging to correction time T2 is MSETPOINT2. At time T1, a setpoint torque value is calculated from value pair MSETPOINT2/T2 by interpolation, the setpoint torque value then is linked to setpoint value MSETPOINT1 in a maximum-value selection. Since, in the example illustrated, this value is less than the value MSETPOINT1, the resulting setpoint torque value MSETPOINTRES is the value MSETPOINT1. Therefore, setpoint value MSETPOINT1 is attained within time T1. In FIG. 9, the equivalent procedure is represented as a minimum selection. In this case, the shortest correction time is also T1. This is assigned to setpoint value MSETPOINT1. MSETPOINT2 and T2 form the other value pair. From this value pair, the interpolation yields a setpoint torque value at time T1, which is less than setpoint value MSETPOINT1. On the basis of the minimum selection, the interpolated setpoint value is therefore output as resulting setpoint value MSETPOINTRES and set within correction time TSETPOINTRES.

The mode of action of the above-mentioned selection of setpoint-torque/correction-time value pairs and their coordination is represented in FIGS. 10a, 10b and 10c, based on an exemplarily selected operating situation, and using minimum coordination. In this context, FIG. 10a illustrates the time characteristic of the actual torque of the drive unit, FIG. 10b illustrates the time characteristic of the setpoint torque, and FIG. 10c illustrates the time characteristic of the setpoint correction time. The driver's command is initially the dominating element. The driver selects a setpoint-torque value MSETPOINT, which is assigned a correction time TSETPOINT and is attained by appropriately increasing the torque according to FIG. 10a. A traction-slip controller acts at time T1. Due to its smaller setpoint torque, a smaller setpoint torque is abruptly selected at time T1, the setpoint torque is assigned a considerably smaller correction time (time T1) on account of the necessary dynamics of the action according to FIG. 10c. Therefore, as of time T1, the actual torque is reduced very quickly to the setpoint torque. Since the setpoint torque remains unchanged up to time T2, the torque does not change anymore when the correction time is unchanged. At time T2, the action of the traction-slip controller is ended, and the setpoint torque is again'set to the driver's command (the setpoint torque of the controller is once again greater than that of the driver's command). The resulting torque is assigned the greater correction time. Depending on the current operating state at time T2, which sets in during the time frame between T1 and T2 as a function of the selected control paths, the torque characteristic either changes slowly in consideration of the long correction time, or initially changes very rapidly up to time T2, before changing more slowly (cf. FIG. 10a). This occurs, for example, when the action of the TCS lasts a long time (driving on snow), since, in this case, the air-charging path is steadily reduced, and a more rapid increase by manner of the ignition angle may not be able to occur, due to lack of reserves. When reserves are present, other operating conditions and demands (e.g. comfort, catalytic-converter heating, protection of components) also play a roll in the decision regarding a rapid or slow increase.

Figure 11:
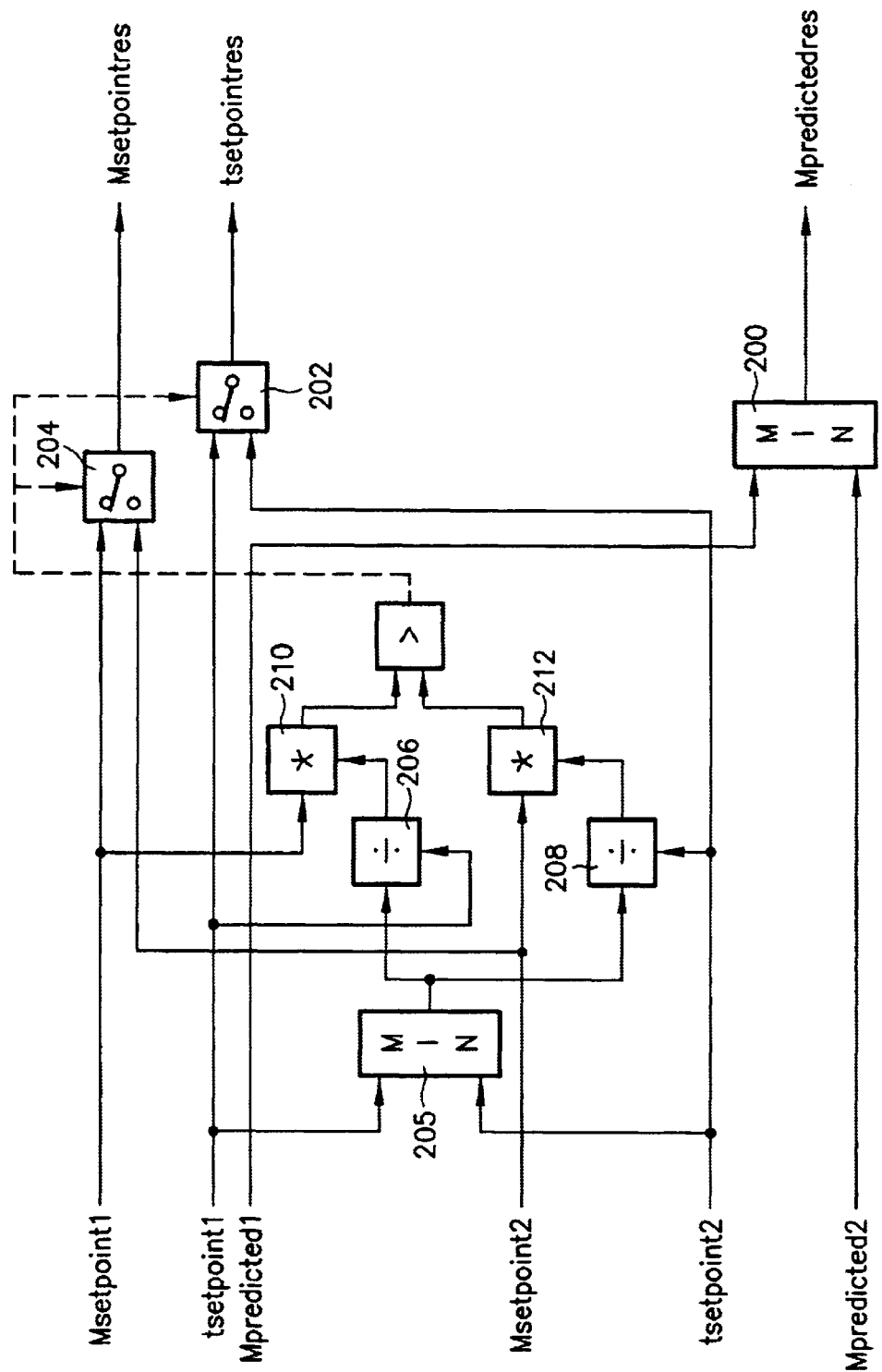
FIG. 11 illustrates a further example embodiment for coordinating the setpoint-value/correction-time demands.

FIG. 11 illustrates a further example embodiment of the coordination of two setpoint-value and correction-time value pairs on the basis of an interpolation. In addition, the predicted magnitude of the setpoint value of the two actions is considered within the scope of the coordination, as well. This predicted magnitude represents the setpoint value which is expected in the future (e.g., during an action of a traction control system, the predicted magnitude is the setpoint value input by the driver). Therefore, the coordinator represented in FIG. 11 is supplied a first setpoint value (e.g., setpoint torque) Msetpoint1, a first correction-time selection tsetpoint1, as well as a predicted value Mpredicted1 of the setpoint variable, the predicted value being assigned to this value pair. Setpoint value Msetpoint2, correction time tsetpoint2, and predicted value Mpredicted2 are supplied from a second action. The two predicted values Mpredicted1 and Mpredicted2 are routed to a minimum selection step 200. In this context, the lesser of the two values represents the resulting, predicted value Mpredictedres, which is considered during the conversion in converter 102 (e.g. when determining the setpoint value of the charge (air supply) for the internal combustion engine).

The two correction time values tsetpoint1 and tsetpoint2 are supplied to switching element 202 in the same manner as setpoint variable values Msetpoint1 and Msetpoint2 are supplied to switching element 204, the switching elements switching over from the illustrated position into the other position as a function of a switching signal. Depending on the position of these switching elements, either the first (Msetpoint1, tsetpoint1) or the second value pair (Msetpoint2, tsetpoint2) is transmitted as the resulting value pair (Msetpointres, tsetpointres) to the control system of the drive unit.

The switching signal for switching over is derived from the two value pairs by interpolating the setpoint values between the corresponding correction time and the minimum correction time. The two correction-time values Tsetpoint1 and Tsetpoint2 are routed to a minimum value selection step 205, in which the minimum correction-time value is ascertained as the lesser of the two values. The minimum correction-time value is supplied to division steps 206 and 208, in which the quotient of the minimum correction-time value and specific setpoint correction time Tsetpoint1 or tsetpoint2 are calculated (tsetpointmin/tsetpoint1 and tsetpointmin/tsetpoint2). At each multiplication point 210 and 212, the specific quotient is multiplied by the corresponding setpoint value Msetpoint1 or Msetpoint2 (210: Msetpoint1*tsetpointmin/tsetpoint1; 212: Msetpoint2*tsetpointmin/tsetpoint2). The two setpoint values evaluated in this manner are then compared to each other in a comparator 214. If the result of step 210 is greater that of step 212, then switching elements 202 and 204 are switched in such a manner that value pair Msetpoint1 and tsetpoint1 are passed on as the resulting variables, while, in the reverse case, the values Msetpoint2 and tsetpoint2 are passed on.

Therefore, in order to determine the resulting value pair, the setpoint value that is present at the time of the smallest correction time (assuming linearity) is determined (setpoint value interpolated at the time of the smallest correction time). The largest of the setpoint value ascertained in this manner then determines the resulting value pair. The latter is the original value pair belonging to the largest interpolated setpoint value.

A torque value may be used as the setpoint value in the example embodiment of FIG. 11, as in the others. However, in other applications, the power, engine speed, etc. are used in place of a torque.

What is claimed is:

1. A method for controlling a drive unit of a vehicle, comprising the steps of:
   setting at least one correcting variable of the drive unit as a function of a setpoint value for an output variable of the drive unit;
   specifying a correction-time variable, within which a setpoint selection variable is set, together with the setpoint value; and
   selecting a correction-time variable independently of a control path for setting the at least one correcting variable.

2. The method according to claim 1, further comprising the step of selecting a resulting setpoint value and a resulting correction time that form a basis for attaining the setpoint value, from a plurality of value pairs of the setpoint value and a setpoint correction time.

3. The method according to claim 2, wherein a lowest setpoint value and a corresponding correction time are selected as the resulting setpoint value and the resulting correction time.

4. The method according to claim 2, wherein a greatest setpoint value and a corresponding correction time are selected as the resulting setpoint value and the resulting correction time.

5. The method according to claim 2, further comprising the step of calculating a lowest correction time and a sum of a setpoint value assigned to the lowest correction time and a setpoint value interpolated on a basis of a setpoint value of at least one value pair at the instant of a correction time as the resulting setpoint value and the resulting correction time.

6. The method according to claim 2, wherein a lowest correction time is selected as the resulting correction time, and a setpoint value calculated from the setpoint value assigned to the lowest correction time and a setpoint value calculated on a basis of at least one other value pair at the instant of a correction time, is calculated as the resulting setpoint value.

7. The method according to claim 2, wherein a lowest correction time is calculated as the resulting correction time, and one of a lowest and a highest setpoint value at an instant of a smallest correction time is calculated as the resulting setpoint value.

8. The method according to claim 1, wherein the correction-time variable is specified in a continuously variable manner.

9. The method according to claim 2, wherein a value pair, in which an interpolated setpoint value is greatest at the instant of a smallest correction time, is passed on as the resulting setpoint value and the resulting correction time.

10. The method according to claim 2, wherein a stated setpoint value is provided, the lowest of the coordinated, stated setpoint values is established as the resulting, stated setpoint value.

11. A device for controlling a drive unit of a vehicle, comprising:
    a control unit configured to set at least one correcting variable of the drive unit of the vehicle as a function of a setpoint value for an output variable of the drive unit; and
    an arrangement configured to set the setpoint value and to receive, as setpoint selection variables, the setpoint value for the output variable, and a setpoint correction time within which the setpoint value is to be set;
    wherein the setpoint correction time is specified independently of a control path for setting at least one correcting variable.

* * * * *

UNITED STATES PATENT AND TRADEMARK OFFICE
CERTIFICATE OF CORRECTION

PATENT NO. : 6,845,750 B2  
APPLICATION NO. : 10/168039  
DATED : January 25, 2005  
INVENTOR(S) : Matischok et al.

It is certified that error appears in the above-identified patent and that said Letters Patent is hereby corrected as shown below:

On the Title of the patent, item (75) Inventors, please correct the First inventor to read --Matischok--

Column 1, lines 42-43, change "an independence of from" to --an independence from--

Column 2, lines 45-46, change "torque M verus time" to --torque M versus time--

Column 2, line 47, change "torque verus time" to --torque versus time--

Column 2, line 48, change "torque verus time" to --torque versus time--

Column 2, line 49, change "torque verus time" to --torque versus time--

Column 2, line 57, change "the time characteristics" to --the time characteristic--

Column 6, line 30, "t he torque magnitude" to --the torque magnitude--

Column 7, line 61, "is again'set" to --is again set--

Signed and Sealed this

Thirtieth Day of January, 2007

JON W. DUDAS  
*Director of the United States Patent and Trademark Office*